July 13, 1943.  A. RONDELLI  2,324,429
FISHING POLE
Filed June 26, 1942  2 Sheets-Sheet 1
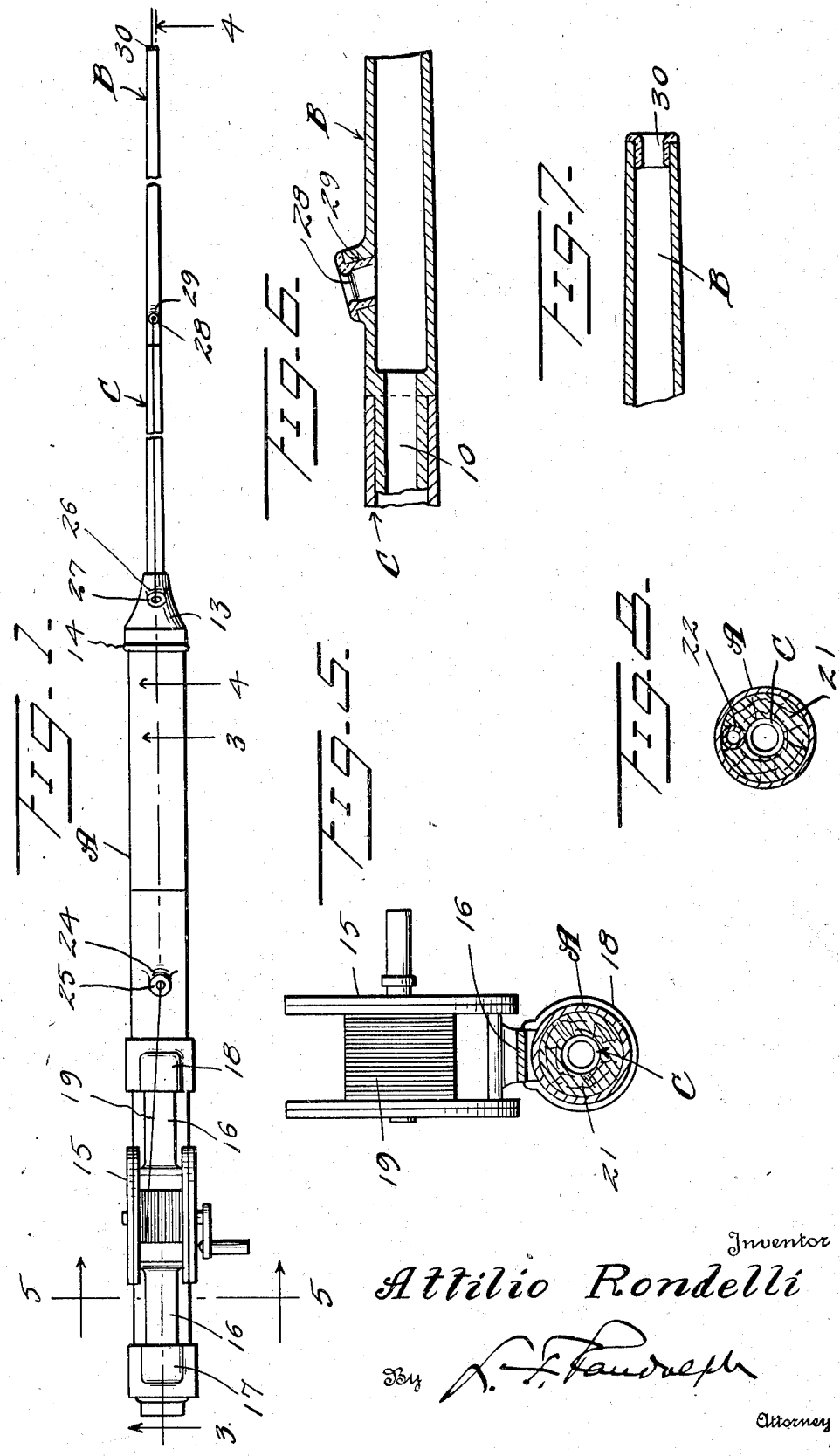
Inventor
Attilio Rondelli
By
Attorney July 13, 1943.  A. RONDELLI  2,324,429
FISHING POLE
Filed June 26, 1942  2 Sheets-Sheet 2
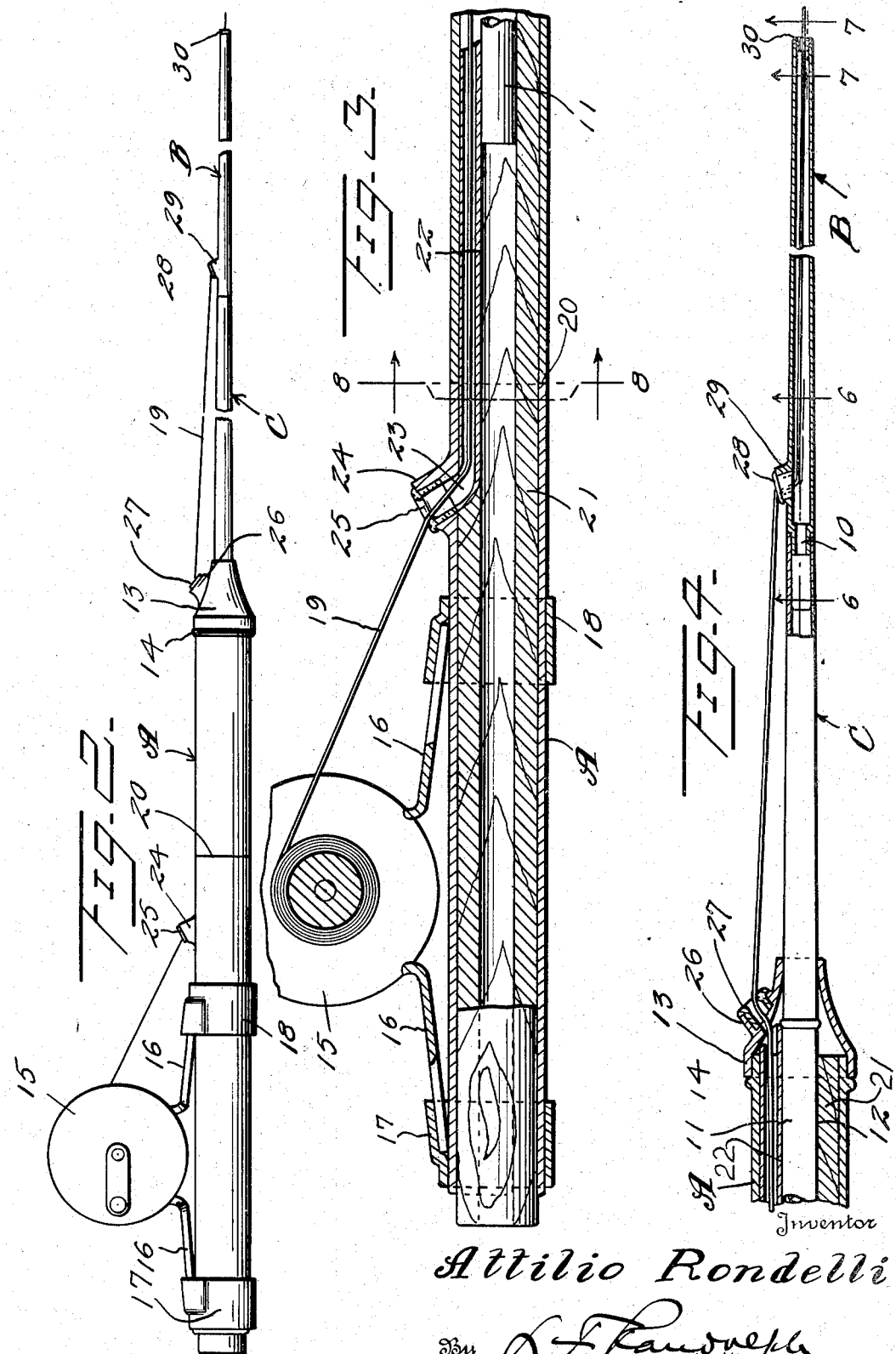
Inventor
Attilio Rondelli
By L. F. Randolph
Attorney Patented July 13, 1943

2,324,429

UNITED STATES PATENT OFFICE 2,324,429

FISHING POLE

Attilio Rondelli, Avoca, Pa.

Application June 26, 1942, Serial No. 448,619

3 Claims. (Cl. 43—18)

This invention relates to a fishing pole.

It is particularly aimed to provide a novel construction which will minimize the danger of tangling of the line around the pole in use and to provide a construction wherein the line or a considerable portion of the length of the pole is rotated within the pole but has a portion exterior of the pole in order that it may be manually engaged by the user in order to provide necessary or desirable slack.

The more specific objects and advantages will in part be pointed out and otherwise become apparent from a consideration of the description following taken in connection with accompanying drawings illustrating an operative embodiment.

In said drawings:

Figure 1 is a plan view of a fishing pole embodying my invention;

Figure 2 is a side elevation thereof;

Figure 3 is an enlarged substantially central longitudinal sectional view taken on the line 3—3 of Figure 1;

Figure 4 is a fragmentary view partly in side elevation and partly in central longitudinal section of portions of the pole taken on the line 4—4 of Figure 1;

Figure 5 is a detail section taken on the line 5—5 of Figure 1;

Figure 6 is a detail section taken on the line 6—6 of Figure 4;

Figure 7 is a detail section taken on the line 7—7 of Figure 4, and

Figure 8 is a cross section taken on the line 8—8 of Figure 3.

Referring specifically to the drawings wherein like reference characters designate like or similar parts, a pole according to my invention may be made up of any desired number of sections, for instance three, namely, a handle section generally designated A, a front section B and an intermediate section C. Obviously, these sections may be of any desired size and dimensions and since the sections B and C are longer than can be illustrated, they are shown broken away in accordance with usual practice.

Sections A and C may be removably or rigidly connected together as preferred. The section C is generally tapered throughout with its smaller end at the front and is tubular. Section B is also tubular and may be slightly tapered and at its rear end has a reduced end 10 which telescopically and detachably engages section C, the joint being held connected by friction.

Said section C has its rear end 11 disposed in a bore 12 of section A. End 11 may be detachably engaged in bore 12 and held therein by friction or the connection may be permanent as preferred. The forward end of handle section A may have a generally tapered shield removably or permanently fastened thereto in engagement with a bead 14 on the handle section. At the forward end, shield 13 snugly fits the section C, being either removably or permanently fastened thereto as preferred.

A conventional reel 15 is detachably mounted on the handle section A in the usual manner, as by means of arms 16, one of which extends into a stationary clamp or ring 17, carried by the handle section and the other of which detachably is engaged by a slidable clamp or ring 18. The fishing line is shown extending from the reel 15, at 19.

Handle section A may be of any desired specific structure and made of any suitable number of parts or sub-sections for instance two which meet at 20 and which sub-sections are held together by a hollow core 21 in which the bore 12 is directly provided. Said section A has a line guiding tube 22 located therein with one end outwardly deflected as at 23, and with the adjacent portion of section A angular and enlarged at 24 to provide an opening or eye, in which an eyelet 25 is mounted. At the other end tube 22 terminates adjacent an angular enlargement 26 in the shield 13, which enlargement provides an opening preferably fitted by an eyelet 27. The line 19 extends through the eyelet 25, tube 22 and out through the eyelet 27 and is exposed along the length of the intermediate section C so that it may be manually engaged by the user to provide the desired or necessary slack in operation. Forwardly of the intermediate section C, the line enters an opening or eyelet 28 therein formed in an enlargement 29 of the section B. This section B is hollow and the eyelet leads thereto so that the line will pass interiorly of such section B and emerge through the opening at the forward end which is fitted with an eyelet 30.

It will be clear that the different parts may be made of any suitable or desired material. I prefer to make the sections A, B and C, unless otherwise specified, of metal. The core 21 may be of wood. The eyelets 25, 27, 28 and 30 may be made of glass or plastic material.

Attention is called to the fact that the portion of the section A between the enlargement 24 and the shield 13 forms a handhold for the user.

Various changes may be resorted to provided they fall within the spirit and scope of the invention.

I claim as my invention:

1. A fishing pole having spaced apart interior passages, each passage at both ends leading to the exterior of the pole, whereby the line may be threaded through said passages and between the same will be exterior of the pole for manual manipulation to provide slack, and eyelets at the terminals of said passages, the pole having a handle section in which one of the passages is provided, and means to mount a reel on said handle section.

2. A fishing pole having spaced apart interior passages, each passage at both ends leading to the exterior of the pole, whereby the line may be threaded through said passages and between the same will be exterior of the pole for manual manipulation to provide slack, and eyelets at the terminals of said passages, the pole having a handle section in which one of the passages is provided, means to mount a reel on said handle section, and a shield at the forward end of the handle section having an opening therethrough for the passage of the line.

3. A fishing pole having spaced apart interior passages, each passage at both ends leading to the exterior of the pole, whereby the line may be threaded through said passages and between the same will be exterior of the pole for manual manipulation to provide slack, and eyelets at the terminals of said passages, the pole having a handle section in which one of the passages is provided, means to mount a reel on said handle section, and a shield at the forward end of the handle section having an opening therethrough for the passage of the line, the pole having a detachable forward section in which the other passage is provided, said forward section being hollow and having an entrance and outlet opening for the line.

ATTILIO RONDELLI.